United States Patent
Sangermano, II et al.

(10) Patent No.: US 10,744,913 B2
(45) Date of Patent: Aug. 18, 2020

(54) DEMONSTRATING AN ACTIVE VIBRATION ISOLATION SYSTEM

(71) Applicant: ClearMotion Acquisition I LLC, Woburn, MA (US)

(72) Inventors: Antonio Sangermano, II, Rindge, NH (US); James A. Parison, New Ipswich, NH (US); Brian A. Selden, Boston, MA (US)

(73) Assignee: ClearMotion Acquisition I LLC, Billerica, MA (US)

( * ) Notice: Subject to any disclaimer, the term of this patent is extended or adjusted under 35 U.S.C. 154(b) by 333 days.

(21) Appl. No.: 15/087,156

(22) Filed: Mar. 31, 2016

(65) Prior Publication Data

US 2016/0272094 A1    Sep. 22, 2016

Related U.S. Application Data

(63) Continuation of application No. 13/758,975, filed on Feb. 4, 2013, now Pat. No. 9,349,304.

(51) Int. Cl.
    *G09B 25/00*   (2006.01)
    *B60N 2/50*    (2006.01)
    *F16F 15/02*   (2006.01)

(52) U.S. Cl.
    CPC ............ *B60N 2/502* (2013.01); *B60N 2/50* (2013.01); *B60N 2/501* (2013.01); *F16F 15/02* (2013.01); *G09B 25/00* (2013.01)

(58) Field of Classification Search
    CPC .......... G09B 25/00; B60N 2/501; B60N 2/50; F16F 15/02

USPC ................................................. 434/401, 375
See application file for complete search history.

(56) References Cited

U.S. PATENT DOCUMENTS

| | | | | |
|---|---|---|---|---|
| 5,618,995 | A * | 4/1997 | Otto | G01M 7/06 434/62 |
| 2004/0167761 | A1* | 8/2004 | Sizov | G09B 9/042 703/8 |
| 2004/0239491 | A1* | 12/2004 | Koutsky | B60N 2/0244 340/438 |
| 2007/0088469 | A1* | 4/2007 | Schmiedel | G05D 1/0274 701/23 |
| 2007/0260372 | A1* | 11/2007 | Langer | G01M 17/04 701/31.4 |

(Continued)

OTHER PUBLICATIONS

Office Action dated Aug. 2, 2016 by the Patent Office of the People's Republic of China for corresponding CN Application No. 2014800072690.

(Continued)

*Primary Examiner* — Michael C Grant
(74) *Attorney, Agent, or Firm* — Wolf, Greenfield & Sacks, P.C.

(57) ABSTRACT

Active vibration isolation (AVI) systems are becoming more available in various markets, one such market being vehicle operator seating. Unfamiliarity with the performance of such systems may cause users initial perceptions of system performance to be unfavorable. AVI systems can include a demonstration system capable of providing simulations too users of various types of vibration isolation systems under various input conditions, so that users can be introduced to the system benefits over other systems before using an AVI equipped product in its intended application.

25 Claims, 6 Drawing Sheets

(56) References Cited

U.S. PATENT DOCUMENTS

2012/0123764 A1\* 5/2012 Ito ........................ G06F 9/5055
703/21

OTHER PUBLICATIONS

English Translation of Office Action dated Aug. 2, 2016 by the Patent Office of the People's Republic of China for corresponding CN Application No. 2014800072690.
"Demonstration: Bose Ride vs Air-ride seat", URL: http://www.youtube.com/watch?v=cffHXhblfaU>Fleet Owner referenced in Office Action dated Aug. 2, 2016 by the Patent Office of the People's Republic of China for corresponding CN Application No. 2014800072690.

\* cited by examiner

DEMONSTRATING AN ACTIVE VIBRATION ISOLATION SYSTEM

CROSS-REFERENCE TO RELATED APPLICATION

This application is a continuation of and claims benefit of application Ser. No. 13/758,975 filed on Feb. 4, 2013, the entire disclosure of which is incorporated herein by reference.

BACKGROUND

Active vibration isolation systems are becoming more available in various markets, one such market being vehicle operator seating. These systems typically replace passive isolation systems. Users of products, systems, etc. that employ active vibration isolation systems may be unfamiliar with active vibration isolation technology, the benefits it provides, how it operates, and what the user should expect from it. This unfamiliarity may cause a user's initial perception of system performance to be unfavorable.

SUMMARY

All examples and features mentioned below can be combined in any technically possible way.

In one aspect, a method for demonstrating an active vibration isolation system configured and arranged to isolate a suspended plant from a vibration disturbance includes a first outputting by the active vibration isolation system actuator of a first time domain force to the suspended plant to cause motion of the suspended plant that simulates motion the plant would experience if a predetermined vibration disturbance was applied and the plant was suspended with a passive suspension comprising a spring and damper; a second outputting by the active vibration isolation system actuator of a second time domain force to the suspended plant to cause motion of the suspended plant that simulates motion the plant would experience if the same predetermined vibration disturbance was applied and the plant was suspended with a normally functioning active vibration isolation system; wherein the first and second outputting can occur in any order.

Embodiments may include one of the following features, or any combination thereof. The active vibration isolation system is capable of operating in either a demonstration mode or a normal function mode and the active vibration system is installed as a component of a larger system, the active vibration isolation system being prevented from operating in a demonstration mode when the larger system is ON. The second outputting occurs within a short time period after the first outputting concludes. The first outputting occurs within a short time period after the second outputting concludes. The second outputting occurs within 10 seconds of the first outputting. The first outputting occurs within 10 seconds of the second outputting. The second outputting occurs immediately after the first outputting. The first outputting occurs immediately after the second outputting. Information identifying information the time domain forces is communicated to a user of the active vibration isolation system. The active vibration isolation system actuator outputs a force that causes radiation of an acoustic signal audible to a user of the active vibration isolation system, to communicate the identifying information to the user. The active vibration isolation system is configured to isolate a seating surface in a vehicle from motion of the vehicle body.

In another aspect, a method for providing audible sound and output motion in an active vibration isolation system includes providing by the active vibration isolation system an audio signal, commutating the audio signal to provide commutated audio output signals, providing by the active vibration isolation system a motion command signal, commutating the motion command signal to provide commutated motion output signals, and combining the commutated audio output signal and the commutated motion output signal to form a commutated combined output signal for provision to individual phases of a multiphase actuator, to simultaneously provide output motion and audible acoustic signal.

Embodiments may include one of the above and/or below features, or any combination thereof. The audio signal is pre-filtered to compensate for rejection of a current feedback loop used as part of the active vibration isolation system. The total harmonic distortion of the audible acoustic signal is less than 10%. The active vibration isolation system is configured and arranged to isolate a suspended seat from a vehicular vibration disturbance.

DETAILED DESCRIPTION

Figure 1:
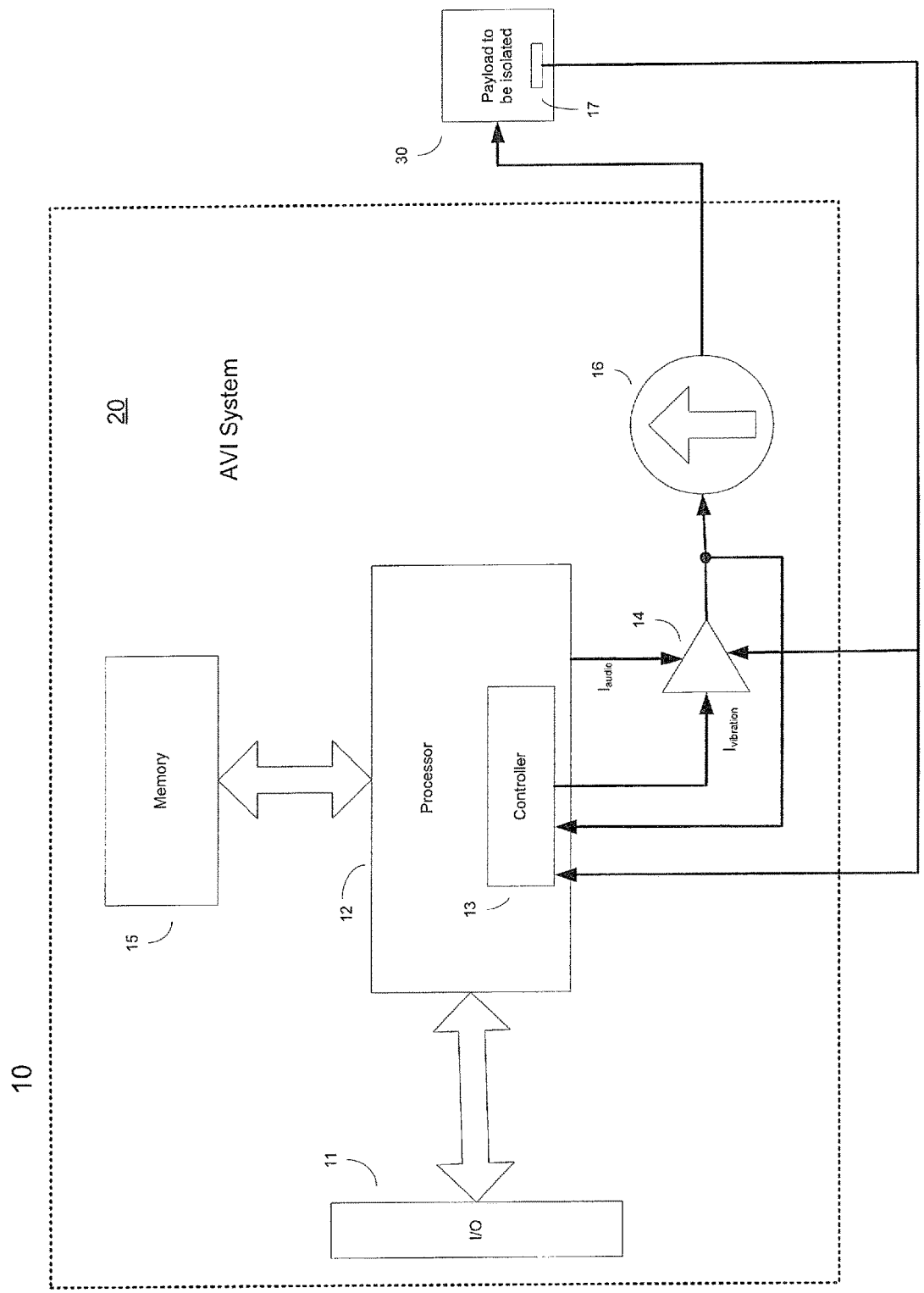
FIG. 1 is a high level block diagram of an AVI system.

This disclosure relates to a self-teaching active vibration isolation (AVI) device. The following discussion will be made in the context of application of AVI technology to a vehicle seat. An AVI system for vehicle seating is disclosed in U.S. Pat. No. 7,983,813, which is herein incorporated by reference in its entirety. However, it should be understood that the embodiments described herein may also be used in any other vibration isolation application where AVI technology may be applicable, and are not limited solely to seating applications. The embodiments disclosed herein are of particular benefit in vibration isolation applications where a human being is exposed to the isolated motion.

New technologies such as AVI can often be hard for a user unfamiliar with the technology to adapt to. Without a thorough understanding of the benefits and the effects of the technology on the resulting motion of a product incorporating AVI, a user may often reject such technology before experiencing the product for a long enough time to realize the benefits. In an application such as a vehicle seat for use in over the road trucking where the vehicle incorporating an AVI seat may have multiple users that vary over time, education methods such as use of user manuals, on line training and the like do not effectively transfer the needed understanding.

One way to educate drivers to understand how the product works and what its benefits are is through having a built-in demonstration and training capability, which for ease of description will be referred to throughout this disclosure as a demonstration system. The implementation of a demonstration system in an AVI application such as vehicle seating can leverage the systems existing components, including: the processor and controller, actuator and sensors, etc. These components can be programmed to produce simulated experiences, voice communication, sounds and motion that can be used to provide a high impact understanding of how the system works and what its benefits are, as well as provide any other key messages that are important for the end user. The components of a typical AVI system will be described in more detail in a subsequent section.

A typical AVI system includes an actuator of some type that can be used to output arbitrary forces, and a controller that is used to determine what forces should be output by the actuator. In a typical vibration isolation application, the goal is to reduce or minimize the vibration of some payload. For example, the goal of the controller may be to reduce the acceleration experienced by the payload to zero, or to some arbitrarily small value. In practice, a controller will have a reference input for acceleration and a reference input for position, and the controller will control motion of the payload to drive payload motion to the reference values. A typical system may use either a feedback or feedforward topology (or a combination thereof) and some control law to drive the output vibration to a desired state (reflected by the reference values). In normal use, the reference value for acceleration would be set to zero, and the position reference would be set to be the midpoint of the isolation system travel.

The same system components used to drive payload motion to the reference values described above can be used in a demonstration mode to conform the payload vibration to follow an arbitrary vibration signature. The goal of the controller will be to drive the error between motion of the system output (motion of the payload) and the intended vibration signature to a minimum value, as opposed to driving total motion to a minimum value. This accomplished by providing to the reference inputs the arbitrary vibration signature it is desired for the payload to follow.

By providing the ability to force the payload of the AVI system to follow an arbitrary vibration signature, the demonstration system can simulate the behavior of various systems and conditions. The user can be provided an experience that faithfully represents what would be encountered by virtually any isolation system (either passive, semi active or fully active), even when such a system is not present. A demonstration system incorporated as part of an AVI equipped device as described herein can simulate how a wide variety of possible isolation systems would perform for a wide variety of possible operating conditions. A demonstration system as described herein can simulate how a wide variety of different isolation systems respond to the exact same input excitation, so performance of the various simulated systems under the same operating condition can be directly compared by the user. A demonstration system as described herein can present simulations of different isolation systems in whatever order is desired by the designer of the demonstration.

A demonstration system as described herein can present simulations of different isolations systems in rapid succession, with whatever time delay between presentations is desired by the designer of the demonstration. Various simulations can be provided essentially immediately one after the other, with a time short delay between presentations such as a few seconds, (which for example can anywhere between 1 second and 10 seconds), or with as much time in between presentations as is desired. For example, an explanation of a simulation may be provided in between presentation of simulations, which may cause the designer to increase the time delay between the simulations presented. Alternatively, explanations can be provided synchronous with the provision of the simulation, and the time delay between different simulations can be minimized. It should be understood that the time between simulations is not limited in any manner, and can be chosen by the designer to be whatever is desired, including zero time delay.

The ability to provide simulations of different systems encountering the same disturbance, the same system encountering different disturbances, or combinations thereof in rapid succession is beneficial in allowing a user to understand the benefits of one system over another. Psychophysical comparisons benefit from reducing the time between the experiences to be compared. It is generally difficult for humans to remember in detail the qualities of sensory experiences (how bumpy something feels, what something sounds like, etc.) as time progresses. A demonstration system as described herein allows comparisons of sensory perceptions to be made in rapid succession which avoids the problem of user memory of the experience fading with time. In the case of comparing various vehicle seating systems, a comparison of different simulated seat vibration isolation systems encountering the same section of road can be done in a far shorter period of time than would be required if physical systems had to be swapped in and out of the same vehicle and the vehicle subsequently driven over the same section of road.

The system designer can choose what simulations to provide to a user to best highlight the performance abilities of a fully active vibration isolation system relative to other isolations systems which the user may be familiar with. In one example of a demonstration system incorporated into AVI seat useful for over the road trucking, a demonstration system might first simulate how a passive suspension comprising a traditional spring and damper arrangement (such as that provided on an Admiral Series Model: 40049 Air Ride seat, available from National Seating which is part of CVG, Commercial Vehicle Group headquartered in New Albany, Ohio) responds to a predetermined vibration input that the seat would experience when a truck incorporating the passive suspension seat encounters a road disturbance. Such a simulation can be generated by recording the actual motion (acceleration and position of the seating surface) of a passive suspension seat as the truck in which it is mounted traverses a section of road. Alternatively, a measurement of truck floor motion that occurs when a particular road disturbance is encountered can be recorded and stored for playback on a controllable vibration platform. A passive suspension seat can be mounted on the controllable platform, and the platform caused to vibrate in a manner analogous to the recorded floor motion. The subsequent motion (acceleration and position) of the suspended portion of the passive suspension seat can then be recorded. This recorded passive suspension seat vibration signature is then used by the demonstration system as the target vibration signature for the first simulation. The recorded acceleration and position signatures are used as reference inputs to the controller. The AVI system will control the payload to follow the reference inputs (the passive suspension seat acceleration and position signatures). In this way, a user sitting in the AVI seat would experience what a user would experience in a truck outfitted with a passive suspension seat as it traversed the section of road where the original recording of truck floor vibration was obtained.

A subsequent simulation can then be provided to the user. In this simulation, the behavior of the AVI equipped seat will be simulated for the same operating conditions as for the passive suspension seat simulation previously presented. Note that while it is possible to provide simulation of a different section of road (or even the same section of road encountered at different speeds) from what was simulated for the passive isolation system, the true differences between systems is more observable when the same road disturbance traversed by the same truck driven in the same manner is simulated. The simulation for the AVI seat can be carried out in an analogous fashion to what was described for the passively suspended seat. In this case, the AVI seat would be mounted to the same vibration test platform and the platform caused to vibrate in a manner analogous to the same truck floor vibration signature as was done previously for the passive suspension seat. In this case, the AVI seat mounted to the vibration test platform would be configured to operate in its normal operating mode (in general with its reference acceleration input set to zero and reference position input set to be the midpoint of suspension travel), and motion (acceleration and position) of the suspended portion of the AVI seat system would be recorded. This recorded AVI seat motion signature would be used in the AVI seat simulation, where the demonstration system would cause the AVI equipped seat to vibrate in a manner analogous to the recorded AVI seat vibration, by applying the recorded acceleration and position signatures to the acceleration and position reference inputs of the controller.

In addition to providing simulations of various systems, a demonstration system may provide additional information to the user. For example, the system may playback voice recordings that describe the demonstration. The recordings may describe the various simulations before, during, or after they are provided to the user. The recordings can point out various aspects of performance the user should pay attention to in order to maximize the effectiveness of the demonstration. The recordings may provide other information such as an explanation of the function of system controls, or any other information which may be desirable to provide to the user.

An AVI equipped device incorporating a demonstration system as disclosed herein can provide a demonstration to users and potential users of the device when the device is installed in its intended application. For the case of an AVI equipped vehicle seat for use in over the road trucking, the demonstration can be provided to a driver of the truck when seated in the truck itself, just prior to driving. A separate facility is not required to provide the various system simulations disclosed, the end product itself is capable of simulating numerous different systems and operating conditions. The simulation capability used in the demonstration system can be provided using essentially all of the same hardware the AVI equipped device uses for its normal function of vibration isolation. A demonstration system included within an AVI equipped device as disclosed herein provides a convenient, cost effective method for demonstrating the benefits of AVI technology to users of the devices incorporating the AVI technology, at the location of and time when the devices are used.

A high level block diagram of a typical AVI system is shown in FIG. 1. This figure omits many details of AVI systems, but is useful to understand the functional blocks incorporated in an AVI system that can be used for the demonstration system. Vibration isolated system 10 comprises the AVI system 20 and the payload to be isolated 30. AVI system 20 comprises an I/O port 11, a processor 12, amplifier 14, memory 15, actuator 16, and sensors 17. I/O port 11 provides an interface for communicating with the AVI system. The I/O port can provide whatever connectivity a system designer wishes to include. It may consist of wired interfaces such as USB, Ethernet, Fire Wire, HDMI, or any other desired hardware interface. A wireless connection to the system using a protocol such as Bluetooth, Zigbee, one of the variants of IEEE 802 or some other wireless protocol is also possible, and may be used in conjunction with or in lieu of a hard wired connection. I/O port 11 may also provide a plug in socket for portable data storage devices such as USB thumb drives, SD cards, etc. I/O port 11 is used to provide a mechanism to input information into the AVI system and/or output information from the AVI system.

Figure 2:
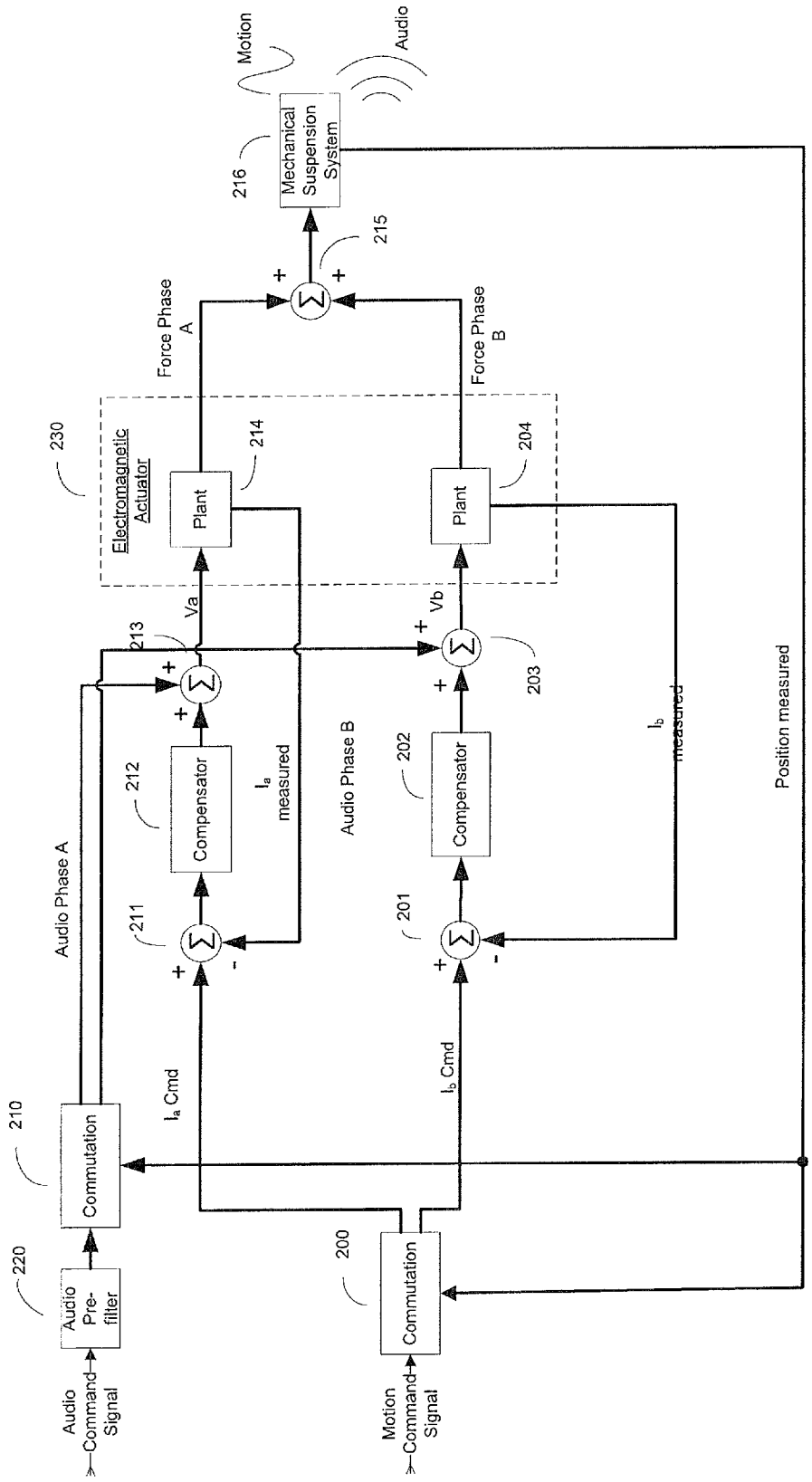
FIG. 2 is a block diagram showing how an audio signal can be input into an AVI system for playback by the AVI system.

Processor 12 is connected to memory 15, I/O port 11, and has various other I/O connections such as the connection to amplifier 14 and sensors 17. A processor may have other I/O as well, such as ports for any other peripheral devices that a designer may choose to incorporate. The processor 12 can receive information directly from I/O port 11 or may retrieve information from memory 15 or from other peripheral devices. In FIG. 1, controller 13 is shown as being contained within processor 12. Controller 13 determines forces required to be output by actuator 16 and issues current commands to amplifier 14 which applies the necessary current (or currents for a multi-phase actuator) to actuator 16 to cause it to output the required force. In FIG. 1, controller 13 is shown as a process that can run on processor 12 and resides within processor 12. However, controller 13 could also be implemented as a separate physical controller that communicates with processor 12 as needed. Sensors 17 sense motion of the suspended plant, or structures that move with the suspended plant. Though not shown, sensors for sensing the vibration of the structure the AVI system is designed to isolate its payload from (such as the vehicle floor in an AVI vehicle seating application) may also be included. In the case of an AVI seat, sensors 17 may sense motion of the frame of the seat top, or they may sense motion of the armature of the actuator that is coupled to the suspended plant. Sensors 17 provide information about the motion of the isolated portion of the system back to the controller 13 and also back to amplifier 14. Controller 13 uses information from the sensors to compute required forces and current commands. Amplifier 14 uses the output from sensors 17 as part of commutation processes 200 and 210, as shown in FIG. 2.

Amplifier 14 has a vibration current input and an audio current input. The vibration current input accepts the current command provided by controller 13. The audio current input will be discussed in more detail in a subsequent section. It should be noted that although the amplifier 14 is shown as being separate from controller 13 and processor 14, portions of amplifier 14 may actually reside within controller 13 or processor 14. For example, the commutation process shown in FIG. 2 may actually be performed within processor 12. It should be understood that the embodiments disclosed are not limited in the particular architecture chosen for the processing carried out by the various components. Separate processors or controllers may be used for various computation tasks, or a central processor with sufficient processing power can be configured to accomplish all required processing tasks.

The demonstration system provides the capability of storing and playing back a custom audio recording. In some cases, an AVI system such as an AVI seat may be purchased by a company for use by numerous employees, contractors, and the like. The company may wish to record a message for playback to users of the system. A software utility can be provided that allows a recording, such as a WAV file (or any other commonly available format for storing audio recordings in digital form, such as MP3, MP4, etc.) to be recorded on a personal computer, smart phone, MP3 player, or other known recording device, for download via I/O port 11 into the AVI system electronics unit.

In some instances, the message can be played to the AVI system user upon or just prior to commencement of the demonstration. In some instances, control over when a message is played can be provided to the purchaser of the system or a designee thereof, so that they can have the message played at the beginning of a demonstration, at the end, or at any time the system is first activated. In general, for safety reasons it is preferable to limit audio communication of information to the user from the AVI system to those times when the normal vibration isolation behavior of the AVI system is not required. However, it should be understood that the embodiments described herein are not limited in any way in the times at which an audio message can be played back through the system to the user. For example, in some embodiments the audio communication ability of the system may be used to communicate an alert or fault condition or other system status information to the user while the system is in normal operating condition. The system can output audible signals communicating information about the status of other vehicle systems, or can be used for whatever purpose a designer would consider using audible output in a vehicle for. It should be understood that the embodiments disclosed herein are not limited in any way to only communicating audible information associated with a demonstration. The demonstration system can output signals that cause seat vibration, and can simultaneously output signals that cause radiation of acoustic signals that can be perceived by the user. Radiation of acoustic signals will be described in more detail in a subsequent section.

In addition to allowing the purchaser of the seat to record a message that can be played back through the AVI system, pre-recorded messages can also be included as part of the demonstration system. In this way, the system can explain to the user what they are about to experience. The recorded messages can provide whatever information the manufacturer of the AVI system wishes to convey to the user. Messages can be used to describe the function of the demonstration system, such as what condition is being experienced and what seat performance is being simulated. Recordings can provide tutorial information on how to operate seat functions. Recordings are not limited in the information they may contain and convey to the users.

To ensure that the presence of a demonstration mode does not compromise the safety of the normal operation of the system, control logic is implemented for starting and stopping the demonstration mode. The demonstration system should only be operable under certain conditions. Flow charts of demonstration system operation are provided in FIGS. 3 and 4. While the flowcharts in FIGS. 3 and 4 and the description thereof are made in the context of an AVI seat used in an over the road trucking application, the logic and flow charts are applicable to any other desired use for an AVI system that may be integrated into some other larger system or device.

Figure 3:
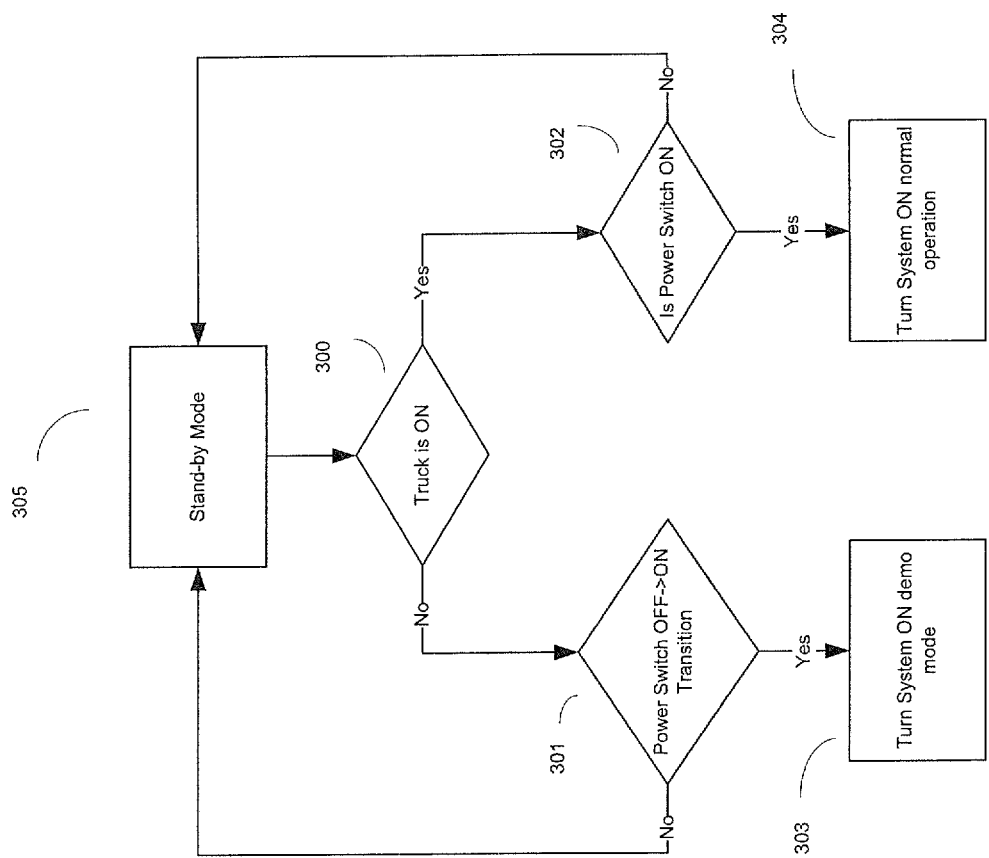
FIG. 3 is a logic flow diagram of the turn on logic of an AVI demonstration system.

The demonstration mode is only allowed to be active if it is determined that the truck is OFF. This keeps the normal AVI system operation and the demonstration operation separate. As shown in FIG. 3, a determination at 300 is made whether or not the truck is OFF. If the truck is determined to be OFF, then the system looks for a transition of the AVI system power switch state from OFF to ON at step 301. If such a state transition is detected the demonstration starts; otherwise the system remains in standby mode 305. The system will start the demonstration when all of the following conditions are true: The truck is OFF, and; the user rocks the product's power switch from OFF to ON (edge triggered). Edge triggering is required because it is desirable for the AVI equipped seat to power itself off when the engine is shut off during the course of normal vehicle operation, thus leaving the AVI system power switch in the ON position. At determination 300, if the truck is determined to be ON, then the state of the power switch on the AVI system is determined. If the AVI system power switch is also ON, then the AVI system turns on in its normal mode of operation. If the AVI power switch is OFF, then the system reverts to standby.

Figure 4:
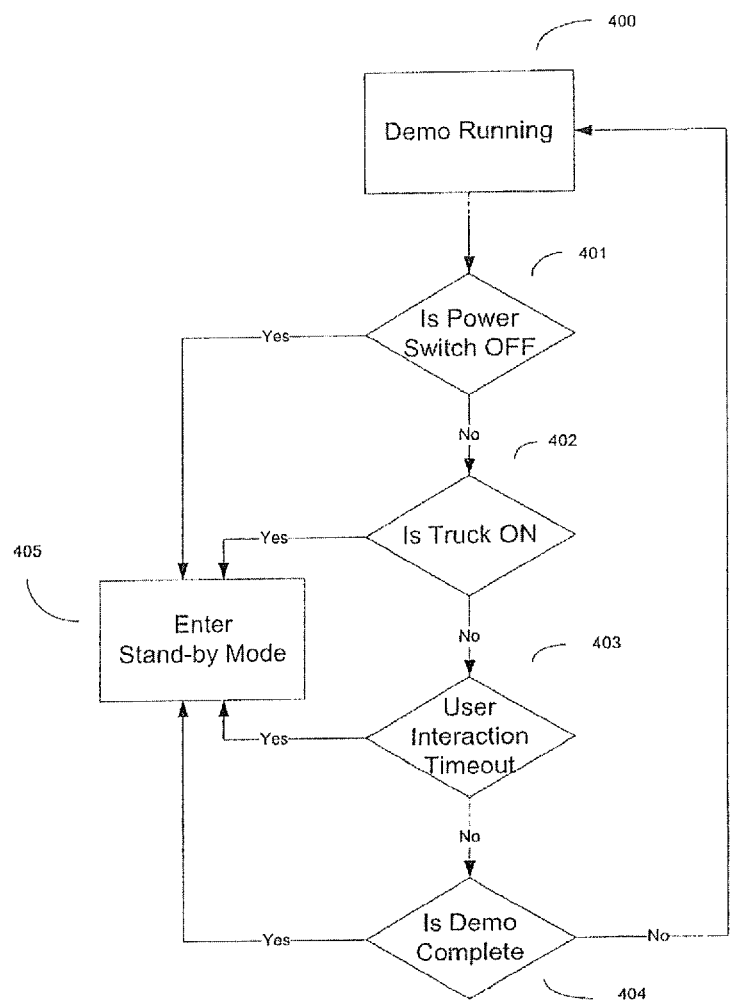
FIG. 4 is a logic flow diagram of the turn off logic of an AVI demonstration system.

FIG. 4 shows the logical operation associated with ending the demonstration. At 400, the demonstration is running. At 401, the state of the power switch on the AVI system is observed. If the AVI system power switch is switched to OFF, the demonstration is terminated and the system goes into standby 405. If the AVI system power switch remains ON, the state of the truck is observed at 402. If the system determines that the truck has switched ON, then the demonstration is terminated and the system goes to standby 405. If the truck remains OFF, a user interaction timer is observed at 403. If the timer times out, then the demonstration is demonstration is terminated and the system reverts to standby 405. If the timer has not timed out, the system observes the state of the demonstration at 404. If the demonstration has completed, the system goes to standby 405. If the demonstration has not completed, the demonstration continues to run and the system is in state 400. The AVI system will end the demonstration and return to standby mode under any of the following conditions: the user rocks the AVI system power switch to OFF; the truck is turned ON; the demonstration reaches completion; the user stops interacting with the system for a predefined period of time (this ensures that the AVI system does not deplete the battery of the system Vehicle in which it is installed if the system (vehicle) is not operating.)

It was mentioned previously that the demonstration system may output audible acoustical signals to communicate information to the user. In some embodiments, it is possible to have the AVI force source 16 generate the acoustic signals that convey information to the user. This removes the need to include a separate audio output subsystem in an AVI device. However, the invention is not limited solely to providing audio output via the vibration isolation force source. It is also contemplated herein that a separate audio subsystem may also be used to communication audio information to a user.

In general, it is only possible for the AVI system actuator 16 to provide an intelligible audio output if the AVI system uses an actuator as a force source that has sufficient bandwidth to provide useful output energy in the audible frequency range. Typical AVI systems designed for vibration isolation are generally designed to control vibration in a frequency range that is below the audible frequency range, or may only extent a short way into the audible frequency range, up to say 50 Hz or so. Such systems typically have not been designed with the intent of providing information such as intelligible speech as an output. In order to accomplish this, a force source with bandwidth sufficient to provide intelligible speech is required, such as an electromagnetic actuator. Electromagnetic actuators useful for this purpose may be linear actuators or rotary actuators. Hydraulic actuators are generally unsuitable for this purpose because they lack sufficient bandwidth.

In addition to requiring a force source with sufficient bandwidth, the control electronics for the AVI system must have an input where an audio signal intended for reproduction can be injected. The signal path from the input audio signal to force output of the actuator should have sufficient fidelity in order to output an acoustic signal of sufficient quality to provide intelligible speech output. In general, the system should be able to output a force into the seat structure up to as high as 4 KHz, preferably up to 5 KHz or greater, with good fidelity. The resulting acoustical output signal should in general have sufficiently low distortion such that a voice signal is clearly audible and intelligible. This can be accomplished with an acoustical signal generally having THD less than 10%, preferably less than 5%, and ideally less than 1%.

Figure 5:
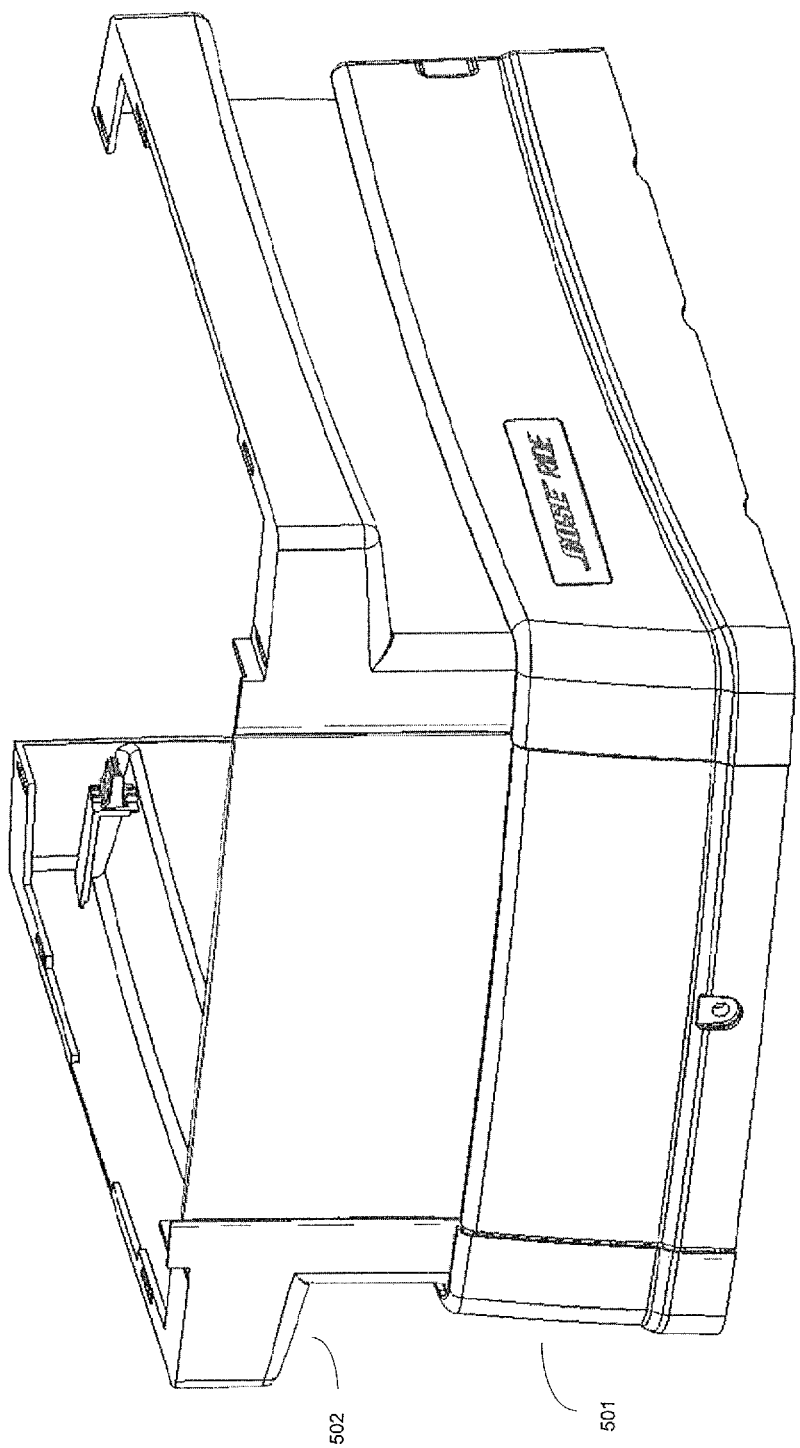
FIG. 5 is a perspective view of skirts for an AVI application in a vehicle seat.

In addition to having a actuator capable of outputting force with bandwidth sufficient to generate intelligible speech (for example up to 4 to 5 KHz) and having a signal path in the AVI system electronics that can accommodate an audio signal input that also provides sufficient fidelity from audio signal input to force output (again with a bandwidth extending up to 4 or 5 KHz or greater), the AVI system must have a structure coupled to the AVI force source capable of receiving the force output of the actuator and radiating sound to the environment in which the AVI system is located with sufficient efficiency such that the audio output is loud enough to be heard by the user. This requires that a radiating structure which is an efficient acoustical radiator be mechanically coupled to actuator in a manner such that force output from the actuator 16 is transferred to the radiating structure. To be an efficient radiator, the system should have low mass and large area. In the case of an AVI system used in a vehicle seating application, these qualities are fulfilled by the AVI system skirts, which are depicted in FIG. 5. The seat skirts in FIG. 5 are made up of bottom portion 501 which is affixed to the AVI system frame that is directly coupled to a truck seat floor, and upper portion 502 that moves with the isolated portion of the seat. The primary purpose of the seat skirt is to protect against intrusion of foreign objects into the space contained within the skirts where the AVI system components are located. In general, better intrusion protection is provided by heavier skirts using thicker wall cross sections, whereas acoustic performance would be improved using thinner wall cross sections (less mass) and material with lower internal damping. Acoustic performance and mechanical characteristics necessary to support the primary functionality of protecting the AVI system electronics from penetration may need to be traded off against each other. In some embodiments, the wall thickness has been reduced 3 mm and stiffening ribs have been added to improve rigidity of the panels.

FIG. 2 provides additional detail showing how an audio signal can be coupled into an AVI system to drive a multi-phase actuator to produce intelligible voice quality while simultaneously providing a desired motion output. FIG. 2 depicts the electronics required to drive two separate phases of a three phase actuator. Describing two phases is sufficient to completely describe the motor because current in the third phase can be unambiguously derived from the current in the first two phases.

A motion command signal is input to commutation block 200. Commutation block 200 determines which phases of the multi-phase motor should have current applied at any given time. The outputs of commutation block 200 are two current command signals $i_a$ and $i_b$. A third phase current $i_c$ can be derived from the first two currents according to the equation:

$$i_a + i_b + i_c = 0$$

Ignoring commutation block 210 and summers 203 and 213 for the moment, currents $i_a$ and $i_b$ feed into two current feedback loops, one for phase A and one for phase B of the motor. At summer 201, the measured current present in phase B is subtracted from the commanded current for phase B to form an error signal that is input to compensator 202. Compensator 202 is chosen to achieve desired characteristics of the feedback control loop, as is generally known in the control arts. Though many control laws are possible for use in compensator 202, in one embodiment a traditional PI controller is used. The output of compensator 202 provides a voltage signal for application to the phase B input of electromagnetic actuator 230. In an analogous fashion, a control loop for phase is also shown comprised of elements 211, 212, and 214. As its operation is the same as the loop for phase B already described, it will not be described further.

The outputs of plants 204 and 214 (and a $3^{rd}$ plant not shown) are forces that are applied between the isolated portion of the system and the vibration input it is desired to isolated the isolated portion of the system from. Motion of the mechanical system 216 is sensed by sensors (not shown in this figure, but shown as sensors 17 in FIG. 1) and fed back to commutation block 200 (and also block 201 which is described further below). The commutation blocks use the position information to determine how to apportion currents across the various phases in order to obtain the desired total force output.

In addition to the motion control system just described, also shown in FIG. 2 are elements used to generate currents for application to electromagnetic actuator 230 that represent an audio signal it is desired for the system to radiate. The input audio signal is input to audio pre-filter block 220. The purpose of pre-filter 220 is to provide a compensation response to invert the signal rejection that the earlier described current feedback loops will exert on the signal. In this way, the inherent disturbance rejection exhibited by the current feedback loops is counteracted. Additionally, pre-filter 220 also provides equalization to correct for deviations in the system linear acoustic transfer function (deviations in the transfer function from audio command signal input to acoustical signal output in the vicinity of the intended listener) from a desired reference acoustic response. The pre-filtered audio signal is then fed to commutation block 210 which forms as outputs audio phase A and audio phase B signals (there is also an audio phase c signal not shown, as it is related to phase A and B signals in the same manner as was described for the commutated currents associated with the motion command signal). The audio phase A signal is combined with the compensated $i_a$ current output from compensator 212 in summer 213 to form voltage signal Va, and the combined signal Va is then applied to plant 214. Similarly, the audio phase B signal is combined with the compensated $i_b$ signal output from compensator 202 in summer 203 to form voltage signal Vb, which is then applied to plant 204.

Figure 6:
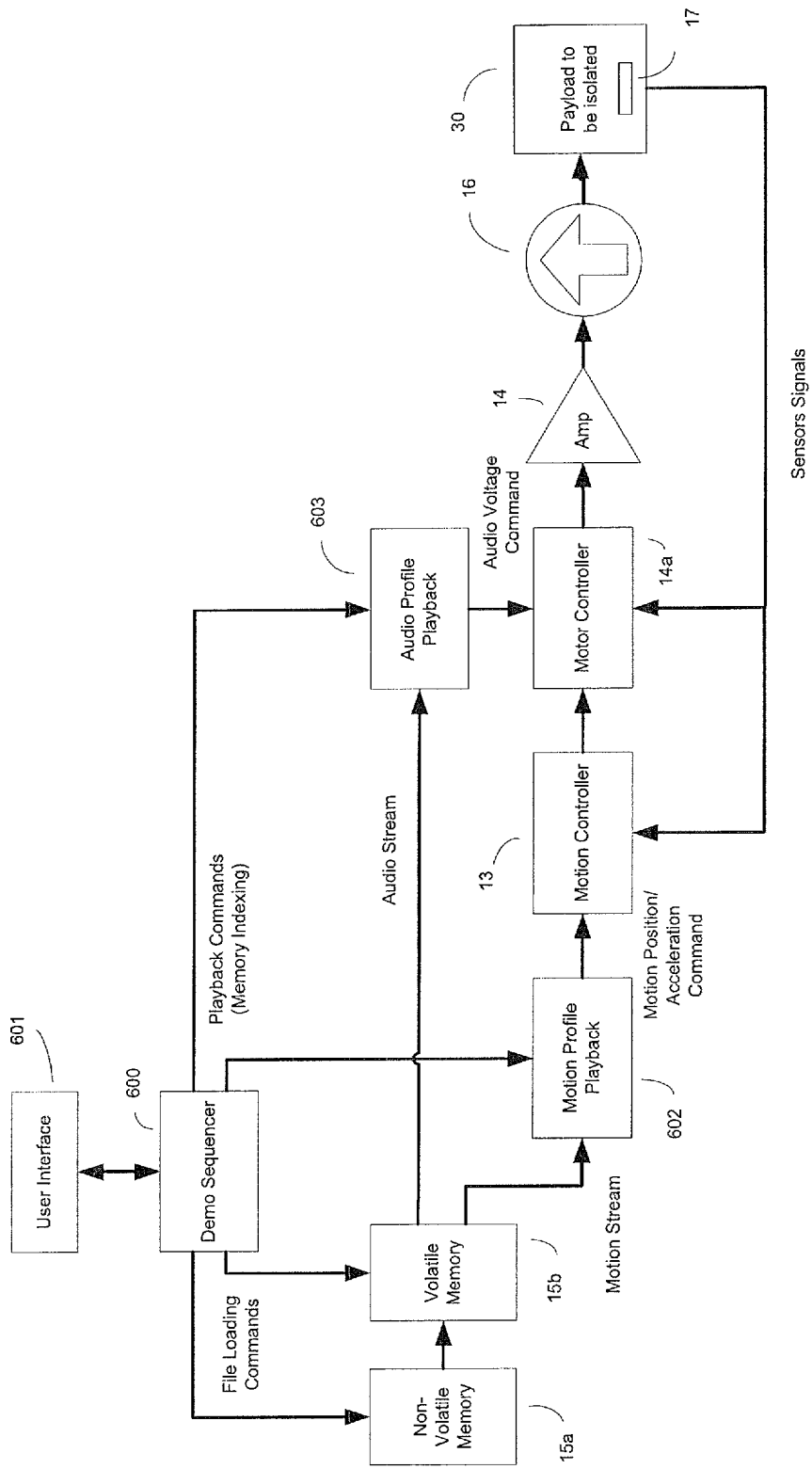
FIG. 6 is a block diagram representation of control functions in an AVI demonstration system.

FIG. 6 provides a logical arrangement of elements to control a demonstration system in an AVI system. Elements in common with FIG. 1 are shown with the same reference numerals in FIG. 6. The demo Sequencer 600, user interface 601, motion profile playback 602, and audio profile playback 603 have been added. Memory 15 of FIG. 1 has been split into non-volatile memory 15a and volatile memory 15b. The demo sequencer 600 controls running of the demonstration. Demo sequencer 600 communicates with and accepts input from UI 601. Demo sequencer 600 issues commands to and communicates with memories 15a and 15b, motion profile playback 602, and audio playback profile 603. The demo sequencer 600 determines what signals are obtained from memory, at what time they are retrieved from memory, and at what time they are passed by the motion profile playback too the motion controller, and at what time the audio signals are passed from audio profile playback 603 to the motor controller.

The motion profile playback block provides the reference motion input for the AVI system comprised of the motion controller 13, motor controller 14a, amp 14, sensors 17 and the payload. In some embodiments, both acceleration and position reference signals are provided to the motion controller. In some embodiments, the relative weights the controller applies to the acceleration and position inputs can be varied by the designer. In some embodiments, only a position signal may be applied. It should be understood that the embodiments described herein are not limited by the exact form of reference input used by the system. Acceleration, position, velocity, either alone or in combination can be used as reference inputs, as long as the resulting output motion of the payload follows the desired vibration signature.

Motor controller 14a combines the audio signal and motion signal into a single current command (or a set of current commands for each phase) that is then provided to the amplifier 14. In FIG. 1, a separate motor controller was not shown. It was assumed that the functions of the motor controller were performed either in the amplifier 14, the controller 13, or split between them. In the embodiment of FIG. 6, a separate motor controller 14a is shown because of the separate audio path provided. In this embodiment, commutation is performed within the motor controller 14a, though this function could also be moved into amplifier 14 as well. The output of amplifier 14 is a set of voltages that are applied to the various phases of actuator 16. Actuator 16 is coupled to payload 30, and motion of payload 30 is sensed by sensors 17. Information representing the motion of payload 30 provided by sensors 17 is fed back to motor controller 14a to be used for commutation purposes, and to motion controller 13 to be used for control of output motion of the payload.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A method of operating an active suspension system in a vehicle, comprising:
   obtaining a motion profile representative of motion experienced by a surface in a first vehicle when the first vehicle is being driven;
   operating an active suspension system in a second vehicle to induce motion of a surface in the second vehicle when the second vehicle is not being driven, wherein the induced motion is at least partially based on the motion profile;
   operating the active suspension system to at least partially mitigate transfer of road induced vibrations to the surface in the second vehicle.

2. The method of claim 1, wherein the first vehicle has a passive suspension system.

3. The method of claim 1, wherein the surface in the first vehicle is a surface of a seat in the first vehicle and the surface in the second vehicle is a surface of a seat in the second vehicle.

4. The method of claim 1, wherein the motion profile includes a quantity selected from the group consisting of an acceleration, a velocity, and a position of the surface in the first vehicle.

5. The method of claim 4, wherein operating the active suspension system in the second vehicle to induce motion is in a demonstration mode of operation.

6. The method of claim 5, further comprising using a user interface to communicate with the active suspension system in the second vehicle.

7. The method of claim 1, wherein the first vehicle and the second vehicle are the same vehicle.

8. The method of claim 1, further comprising:
   traversing a road surface with the second vehicle, wherein operating the active suspension system to at least partially mitigate transfer of vibrations to the surface in the second vehicle occurs during traversal of the road surface by the second vehicle.

9. A vehicle comprising:
   a seat;
   an active suspension system that includes:
      at least one actuator;
      a processor;
      at least one sensor;
      a controller; and
      computer memory that stores information about a motion profile;
      wherein the controller is constructed and arranged to provide a first series of force commands to the at least one actuator to induce a motion of the seat, based at least in part on the information, when the vehicle is not being driven, and to provide a second series of force commands to the at least one actuator to mitigate a motion of the seat, based at least on measurements by the at least one sensor, when the vehicle is being driven.

10. The system of claim 9, wherein the motion profile is a function of motion experienced by a passively suspended seat in a vehicle when the vehicle is driven over a section of road.

11. The system of claim 9, further comprising a user interface constructed and arranged to receive operator input, wherein the first series of force commands are also based partly on the operator input.

12. The active suspension system of claim 11, wherein the computer memory is selected from the group consisting of non-volatile memory and volatile memory.

13. The method of claim 9, wherein the controller and the processor are distinct units.

14. The system of claim 9, wherein the controller and the processor are integrated in a single unit.

15. A method of operating an active suspension system in a vehicle, comprising:
   in a first demonstration mode, using the active suspension system in the vehicle to simulate a first response of a first simulated suspension system to a predetermined disturbance; and
   in a second demonstration mode, using the active suspension system in the vehicle to simulate a second response of a second simulated suspension system to the predetermined disturbance, wherein the active suspension system of the vehicle is configured and arranged to operate in a normal function mode to isolate a portion of the vehicle from a vibration disturbance.

16. The method of claim 15, wherein the first response is a first motion of a seat and the second response is a second motion of the seat.

17. The method of claim 15, wherein the first simulated suspension system is a passive suspension system and the second simulated suspension system is a fully active suspension system.

18. The method of claim 15, wherein the first simulated suspension system is a semi-active suspension system and the second simulated suspension system is a fully active suspension system.

19. A method of operating an active suspension system in a vehicle, comprising:
   accessing, from a storage device, information based on a previously recorded and stored motion profile;
   computing a series of force commands based at least in part on the information;
   providing the series of force commands to at least one active suspension actuator in the vehicle;
   producing a series of forces with the at least one actuator in response to the series of force commands to induce a motion in a portion of the vehicle;
   traversing a road surface with the vehicle;
   during traversal of the road surface with the vehicle, operating the at least one actuator to at least partially mitigate transfer of vibrations to the portion of the vehicle.

20. The method of claim 19, wherein the portion of the vehicle is a plant in the vehicle.

21. The method of claim 20, wherein the plant is a seat.

22. An active suspension system in a vehicle, comprising:
   at least one actuator;
   a controller; and,
   computer memory that stores a previously recorded motion profile;
   wherein the controller is configured to control the at least one actuator to induce motion in the portion of the vehicle based at least partly on the motion profile when the vehicle is not being driven and to mitigate a motion of the portion of the vehicle when the vehicle is being driven.

23. The vehicle of claim 22, wherein the computer memory is selected from the group consisting of non-volatile memory and volatile memory.

24. The method of claim 22, wherein the portion of the vehicle is a plant in the vehicle.

25. The method of claim 24, wherein the plant is a seat.

* * * * *